United States Patent [19]

Smith et al.

[11] Patent Number: 4,567,348
[45] Date of Patent: Jan. 28, 1986

[54] AUTOMATED WELD TORCH GUIDANCE CONTROL SYSTEM

[75] Inventors: Hubert E. Smith; William A. Wall; Morrison R. Burns, Jr., all of Huntsville, Ala.

[73] Assignee: The United States of America as represented by the Administrator of the National Aeronautics and Space Adminstration, Washington, D.C.

[21] Appl. No.: 685,607

[22] Filed: Dec. 27, 1984

Related U.S. Application Data

[63] Continuation of Ser. No. 460,733, Jan. 25, 1983, abandoned.

[51] Int. Cl.$^4$ .............................................. B23K 9/12
[52] U.S. Cl. ................................ 219/124.34; 318/577; 358/101; 901/42; 901/47
[58] Field of Search ................ 901/42, 47; 219/124.34, 219/124.22; 318/577; 358/101

[56] References Cited

U.S. PATENT DOCUMENTS

| | | | |
|---|---|---|---|
| 4,380,696 | 4/1983 | Masaki | 219/124.34 |
| 4,390,955 | 6/1983 | Arimura | 358/101 |
| 4,410,787 | 10/1983 | Kremers et al. | 219/124.34 |
| 4,412,121 | 10/1983 | Kremers et al. | 219/124.34 |

FOREIGN PATENT DOCUMENTS

| | | | |
|---|---|---|---|
| 2711660 | 9/1978 | Fed. Rep. of Germany | 219/124.34 |
| 55-50984 | 4/1980 | Japan | 219/124.34 |
| 56-136280 | 10/1981 | Japan | 219/124.34 |

Primary Examiner—Clifford C. Shaw
Attorney, Agent, or Firm—Joseph H. Beumer; John R. Manning; Leon D. Wofford, Jr.

[57] ABSTRACT

A device for automatically controlling the movement of a welding torch (10) while welding an elongated joint (18). A charge injection television camera (30) is carried on a movable support (20) and includes a matrix of individual light sensing video elements (pixels, 32) which generate voltages responsive to light reflected off of the joint (18) and surrounding areas of the workpiece (12). The voltages produced by the pixels (32) are converted to digital words which are fed to a microprocessor (54) for generating an error signal. This error signal is fed to a digital motor (26) which is used to drive a movable support (20) upon which the television camera (30) is carried.

16 Claims, 4 Drawing Figures

AUTOMATED WELD TORCH GUIDANCE CONTROL SYSTEM

ORIGIN OF THE INVENTION

The invention described herein was made by employees of the United States Government and may be manufactured and used by or for the Government for governmental purposes without the payment of any royalties thereon or therefor This application is a continuation of application Ser. No. 460,733, filed 1/25/83 now abandoned.

BACKGROUND OF THE INVENTION

This invention relates to automatic welding and more specifically to automatic welding using a charge injection device forming part of the closed circuit television camera that is used for guiding a welding torch along a joint.

Heretofore, many different methods have been developed to provide automatic precision welding. When welding relatively large articles together such as, for example, tanks, ship hulls, etc., a type of automatic control utilizing a track and carriage is normally used. This requires precision placement of the track relative to the seam that is to be welded. One type such device is disclosed in U.S. Pat. No. 3,229,883.

As more sophisticated needs for welding have developed such as welding space vehicles and the like, it is important that the quality of the weld be extremely high so as to pass extensive tests and examination. From the tests provided on welds, flaws often show up which require re-welding of the seams and sometimes discarding of the material that is to be welded.

In an attempt to overcome these problems, there has been disclosed in U.S. Pat. No. 3,532,807 a method for automatically welding a workpiece by using a closed circuit television as a guidance system. With the television camera viewing the workpiece, the lines of scan of the television are arranged parallel to the joint to be welded so that with the proper arrangement of lights, the brightest light received by the television comes from the joint to be welded. With a blanking circuit to eliminate errors caused by light reflected from scratches and rough spots, all that is left is the television signal voltage generated from the bright weld joint along the single line of scan. As the weld torch is moved along the surface, corrections are made by counting the position of the line of scan containing reflections from the weld point and converting a change in position of reflection to an analog signal. A servo motor is driven by the analog voltage to correct variations in position of the weld torch.

One problem with such a method is that it requires the light source to illuminate the weld joint to be located very close and at a very disadvantageous position to the weld joint. It also requires special weld joint preparation to accommodate the seam tracking. More specifically, the weld joint was required to be chamfered to assure that the light striking the chamfer from the light source was reflected into the CCTV camera.

Another disadvantage is that the light source had to be maintained at a specific height above the workpiece in order to properly operate the tracking system. Still another disadvantage of the prior art system is that if the two pieces of metal to be welded together at the joint are offset to each other, that would adversely effect the welding operation due to the manner in which the light is reflected from the chamfered surface.

Accordingly, it is an object of the present invention to provide a reliable, fully digital automatic closed circuit television seam tracking control system for accurately guiding a weld torch along a joint to be welded.

Another important object of the present invention is to provide an apparatus for welding joints that is easily adaptable to a variety of weld process systems.

Still another important object of the present invention is to provide an automatic guidance system for a welding torch that does not require extensive workpiece preparation.

A further important object of the present invention is to provide a guidance system for a welding torch that utilizes a TV camera and a light source wherein the illumination from the light source is not critical as to alignment, brightness and proximity to the workpiece.

Still another important object of the present invention is to provide a guidance system for an automatic welding apparatus wherein errors due to workpiece scratches, loss of signal, extraneous light reflection, workpiece offset or workpiece hold-down fixturing is eliminated or minimized.

SUMMARY OF THE INVENTION

The above objectives are accomplished according to the present invention by providing a device for automatically controlling the movement of a welding implement so that the welding implement is properly positioned over a joint of a workpiece to be welded. The device includes a movable support member which carries the welding implement and a charge injection television camera. A matrix of individual light sensing video elements (pixels) forms part of the camera, and the pixels are arranged in rows and columns.

A source of light is also carried by the movable support member and directs a beam of light onto the joint that is to be welded. Lens focus reflective light emanating from the light source onto the pixels causing the pixels to generate individual voltages responsive to the intensity of the reflected light. The individual voltages are converted into digital words and a microprocessor analyzes these voltages to determine if the intensity thereof indicates that they are either a dark reflection or a light reflection. If it is a dark reflection, such indicates that the reflection made by the weld joint.

The microprocessor also calculates the location of the signal representing the dark reflection and produces an error signal that is digitized and fed back to a digital motor that is used for shifting the welding torch so that it will be in alignment with the joint.

The invention will be more readily understood from a reading of the following specification and by reference to the accompanying drawings forming a part thereof, wherein an example of the invention is shown and wherein:

DESCRIPTION OF THE PREFERRED EMBODIMENT

Figure 1:
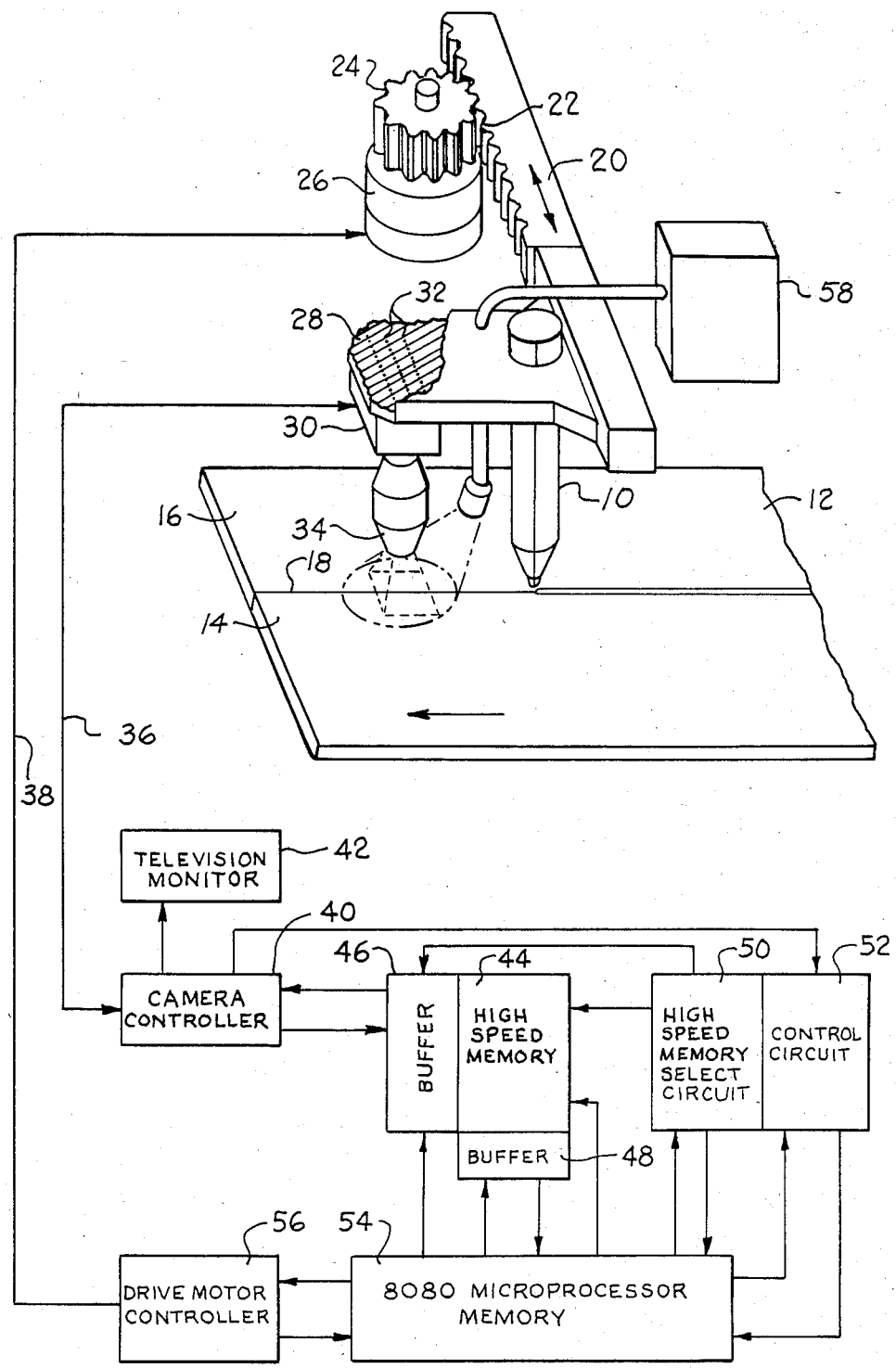
FIG. 1 is a schematic diagram partially in block form illustrating a guidance system for a welding torch constructed in accordance with the present invention.

Referring in more detail to FIG. 1 of the drawing, there is illustrated an apparatus for automatically controlling the movement of a welding implement such as a conventional welding torch 10 over a workpiece 12 that consists of two metal plates 14 and 16 that are positioned adjacent each other forming a joint 18 that is to be welded. The apparatus further includes a movable support member 20 which includes a rack 22 that meshes with a gear 24 carried on top of a digital cross seam drive motor 26. By selectively driving the digital motor 26 in either direction, the movable support member can be shifted to properly position the torch 10 relative to the joint 18.

Also carried on the movable support member is a commercially available charge injection device 28 forming part of a solid state closed circuit television camera 30. The camera system includes a matrix of individual light sensing video elements shown schematically at 32 which are referred to as pixels. These pixels 32 generate voltages responsive to the light impinging thereon. The voltages from the individual pixels 32 are, in turn, digitized and fed out of the camera unit as an eight bit parallel word format at a 4.5 megahertz rate. The digital words are fed to an analyzing circuit over line 36 which will be discussed in more detail later. The camera also has a standard analog video output that can be displayed on a standard CCTV monitor. The digital video signal is obtained from the more than 60,000 individual light sensing picture elements (pixels). The pixels are arranged in the form of a matrix which consists of 244 rows with each row having 248 pixels therein. The pixels are spatically fixed, thus providing geometric accuracy and stability for controlled application.

Associated with the camera 30 is a lens 34 which is focused on the joint 18 provided in the workpiece which is to be welded together. The camera field of view is magnified through the lens system 34 before impinging on the pixels array. A voltage level is set on each pixel depending directly on the amount of light striking that pixel. The voltage level of each pixel is read with the value being digitized as an eight-bit parallel word. This eight-bit signal is, in turn, fed over the output line 36. The maximum range of the digitized signal level is from 0 to 255, with 0 being the darkest (no light) and 255 being the brightest.

The circuit for analyzing the digital signals produced by the camera and supplying an error signal back over lead 38 to the digital motor 26 for adjusting the position of the welding torch include a camera controller 40, a television monitor 42, a high-speed memory 44, buffers 46 and 48, a high-speed memory select circuit 50, a control circuit 52, a microprocessor 54, and a drive motor controller 56.

The 4.5 megahertz digital data output of the camera that is being fed over lead 36 is much too high frequency for the microprocessor system 54 to handle. Therefore, a high-speed memory 44 and a memory control circuit 50 and 52 is provided to receive the data from the CID camera 30. After the microprocessor 54 has read the high speed memory 44, the memory control circuit 52 is released to obtain another line of data. A new line of data is taken every 3 milliseconds (every other vertical sync pulse). The vertical sync pulse triggers a counter in the control circuit 52 and the 128 horizontal lines (horizontal sync pulses) are counted. At this time, the control circuit 52 opens gates to the high speed memory 44 and buffer 46. The next line of data is placed in the high speed memory in locations 0–255 by the memory select circuit 50 through buffer 46. Data is not valid for 24 of these locations because these 24 are always blanked by the camera controller. Therefore, the data from only 232 light sensitive pixels is available for analysis by the microprocessor 54. The high speed memory and memory control portion of the system then waits until the microprocessor 54 again reads the data in the high speed memory, through buffer 48 and releases the control circuit to obtain another video horizontal line of data. The microprocessor 54, the stepping motor controller 56, the mechanical cross seam actuator 20, and a fiber optic illumination source 58 are all conventional off-the-shelf items.

As can be seen, the fiber optic illumination source 58 focuses light directly down on the workpiece so that reflections can be reflected directly back up into the lens from the joint and workpiece.

Simplified Theory of Operation

Figure 4:
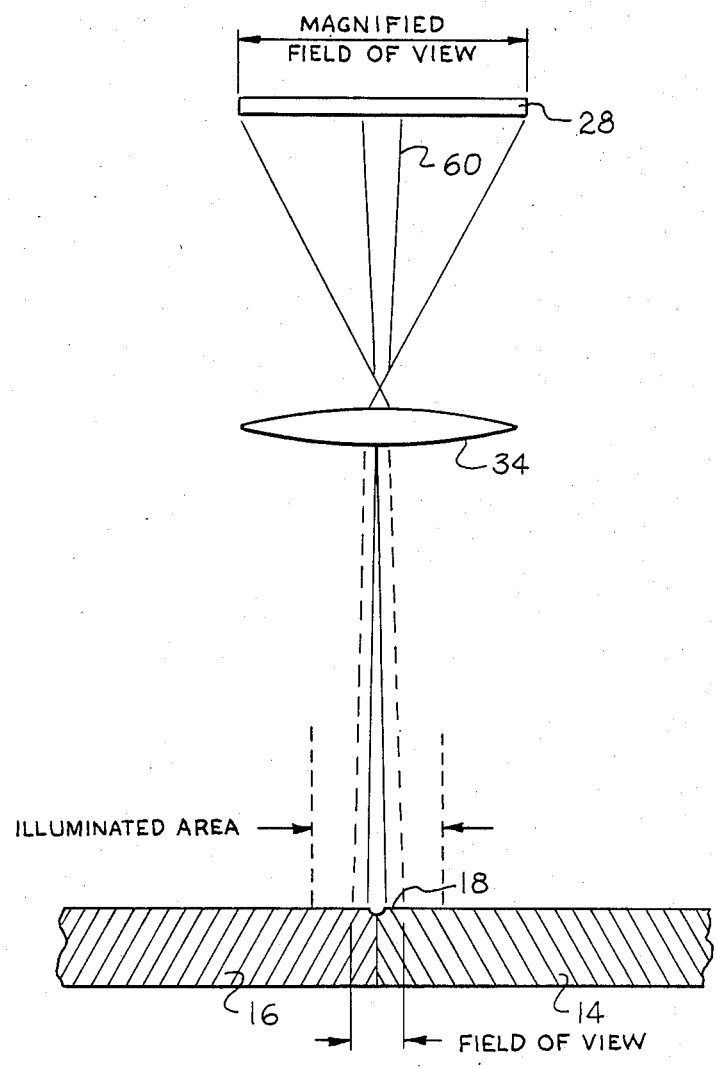
FIG. 4 is a schematic representation illustrating the reflected signals from the workpiece impinging on a matrix of pixels.

To generate a tracking signal, a TV scan area is flooded with light, by the fiber optic illumination source 58 perpendicular to the workpiece and the metal surface reflects the illuminated area into the TV camera lens that is illustrated schematically in FIG. 4. Since the camera lens is perpendicular to the workpiece, the joining edges of the two sections to be welded will have very little light reflected into the camera. As a result, the joint 18 will be displayed by the TV monitor 42 as a dark line while the reflected illuminated surface adjacent the joint 18 will be displayed as a lighted area. The microprocessor system receives the digital signal information from the camera over line 36, calculates the average value of the lighted area and the average value of the dark line and then calculates a point midway between the light and dark values producing a threshold level so that all signals therebelow are considered dark signals and all signals thereabove are considered light signals. Such is often referred to as a tracking decision level. Each element or pixel in the CID camera is read as a digital value between 0 and 255. This value represents the light level impinging on the pixels 32. The decision level is continually recalculated and updated to correct for any lighting change as seen by the camera pixel aray. The CID TV camera has an array of 6,512 charge injection device pixels 28 as the light sensitive elements. Through conventional TV scanning means, each pixel in the focal plan is subsequently scanned and the light level signal digitized as an eight-bit word. The control circuit and memory select circuit selects only one horizontal line of 248 pixels to obtain tracking data. This horizontal line is approximately at the center of the camera pixel array. Each pixel of this line is sequentially transmitted as eight-bit word representing its sense light level to the high speed memory 44. From the high speed memory, the microprocessor performs an analysis of the digital data, locates both edges of the dark line, determines the center, and computes a tracking error signal. This tracking error signal or corrective signal, is transmitted through the drive motor controller 54 to the cross seam drive motor 26 for causing the gear 24 to be rotated in the proper direction to align the torch 10 on the seam.

Detail Theory of Operation

In FIG. 1, there is a block diagram of the system that utilizes charge injection devices (CID) digital television camera 30 as a joint detector to detect the light level between the dark joint 18, or weld seam, and the reflected surface of a workpiece 14 and 16. This detected signal is used to automatically guide a welding torch 10 along a seam joining the two metal surfaces 14 and 16. The CID camera 30 is different from the normal VIDICON type TV camera. (See U.S. Pat. No. 3,532,807 for the operation of a TV VIDICON camera system.)

Figure 2:
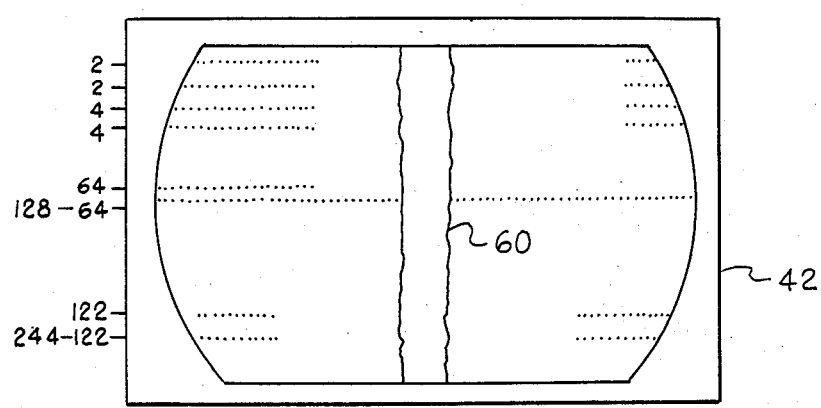
FIG. 2 is a diagrammatic representation illustrating a TV monitor showing the position of a weld seam thereon.

The CID camera 30 has 248 light sensitive detector elements or pixels 28 per line for each of the 244 horizontal lines. Since the monitor 42 is a conventional television receiver, it requires two interlace field arrays every 33 microseconds. Each field is triggered by a vertical sync pulse, and each field has 262 horizontal video lines which are triggered by the horizontal sync pulse. These pulses are generated by the CID camera controller 40 for controlling the video sequencing of the camera 30. Since there are only 244 horizontal lines of pixels 28, each line is displayed twice in sequence on the monitor 42 and the remaining 18 lines are blank. (See FIG. 2). This scheme does provide the required 262 lines per field.

To begin the tracking operation, the CID camera 30 and the weld torch 10 are approximately aligned with the joint. Video on the TV monitor 42 will be similar to that shown in FIG. 2. For prealignment, it is only necessary to see the weld joint image on the monitor 42. The system will automatically align itself upon command. Vertical sync pulse to begin the first field scan enters the control circuit 52 setting a counter circuit contained therein. Each horizontal sync pulse is then counted by the counter circuit contained in the control circuit 52. At horizontal sync pulse 128, (approximately the center of the camera pixel array, FIG. 2), control circuit 52 opens gates of memory select 50 and buffer 46 allowing the next 256 high speed memory locations to be filled with eight-bit data words. There are 24 of these data words that are blanked by the camera controller 40. Only the data from 232 pixels are available to use in the tracking signal calculations. The next horizontal pulse closes the gates and sets a flag to signal the microprocessor 54 that data have been received. When the microprocessor 54 completes the data analysis on the last data reading, it will open the control gates to buffer 48 and memory select 50 allowing the one line of data to be fed into the main processor memory forming part of the microprocessor 54. The gates to buffer 48 and to the memory select 50 are closed and control circuit 52 is set to obtain another line of data when triggered by another vertical sync pulse. Data is taken every other vertical sync pulse to utilize the same data position on the camera pixel array.

Figure 3:
FIG. 3 is a typical video signal wave form produced by reflected signals from a workpiece.

After the data are received into the microprocessor memory, the initial operation is to calculate the position of the weld joint image and send an error signal to the motor controller 56 indicating the number of pulses to send to the digital drive motor 26 to align the weld torch 10 with the joint 18. To determine the number of corrective drive motor pulses required for the alignment of the torch 10, with the center of the joint 18, a reference pixel in the camera pixel array is chosen (116) which is approximately in the center of the pixel line. The position of the joint image is calculated by determining how many pixels the image is from the reference pixel. The tracking signal generated by the one horizontal line of the 232 pixels will be similar to FIG. 3 (relative darkness and lightness of the signal will depend on the amount of illumination and the reflective surface).

After the initial alignment of the weld joint 18 has been completed, the width of the joint is calculated (in number of pixels) and this value is stored in memory contained in the microprocessor 54. To eliminate the possible use of false data from scratches or pitted areas on the workpieces 14 and 16, only the data from a small viewing area on either side of the joint is used to calculate the further tracking data. This window effect is accomplished by adding to the weld joint width twice the average error correction plus 12 pixels (6 pixels either side of the joint). The microprocessor 54 only reads the data from these pixels in the calculations of further tracking data. From this small group of pixels, the tracking data is continually calculated by using the average of the white pixel values and the average of the dark, or joint, pixel values. It then calculates the digital value at the mid point between these two values as the decision or threshold level. Continually updating the decision level compensates for any change in illumination or light reflection from the workpiece.

For each horizontal line of data (232 pixels) placed in the high speed memory 44, the microprocessor 54 calculates the weld joint width error correction, average of the last error correction, tracking signal decision level, and stores these values in a RAM memory carried in the microprocessor 54. New data is compared to these stored values and the microprocessor 54 makes the decision, if the new data is valid, before making any corrections or updating the stored values. If the new data is valid, the error signal correction is fed to the drive motor controller 56 which sends the required digital pulses to the drive motor 26 to move the weld torch 10 to the center of the joint 18. If the error correction is more than the average of the last eight error corrections plus four pixels, the system will count this as an erroneous data, make an error correction equal to the average error of the last eight data cycles, and then take another line of data. After 32 consecutive erroneous readings, either missed data or erroneous data, the microprocessor will stop the tracking system and output a signal to shut down the weld torch and travel system. Any suitable program can be utilized in the microprocessor for accomplishing the calculations set forth above.

Of course, the microprocessor can be programmed to protect against any abnormal operation and shut down the entire operation if one occurred.

While a preferred embodiment of the invention has been described using specific terms, such description is for illustrative purposes only, and it is to be understood that changes and variations may be made without departing from the spirit or scope of the following claims.

We claim:

1. Apparatus for positioning a member relative to a surface location which reflects less light than adjacent surface areas comprising:
   a movable member;
   an actuating means for moving said member in a desired direction relative to said surface location;
   a camera means adapted to view a selected area including said surface location and portions of said adjacent surface areas;
   said camera means having light sensing video elements arranged in a two-dimensional matrix of rows and columns which are adapted to generate individual voltages according to the intensity of light incident on said light sensing video elements so that said surface location is represented as a dark location appearing darker in said viewed surface location than said portions of adjacent surface areas;

a predetermined reference including a single prescribed row of said video elements and a single one of said video elements arranged in said single row and selected as a reference point for determining the position of said dark location;

converting means for changing the individual voltages of said light sensing video elements into digital information;

a light means adapted to direct constant light toward said selected surface area viewed by said camera means for illuminating said selected area with an uninterrupted and continuous solid light pattern;

said video elements in said two-dimensional matrix generating voltage signals responsive to the light intensity received by said video elements;

said processor means receiving digital information of said two-dimensional matrix and calculating an average value representing a dark area, an average value representing a lighted area, and then producing a threshold level so that signals therebelow are considered dark signals and all signals thereabove are considered light signals;

processor means for receiving the digital information from said converting means and further calculating from digital information only from said single reference row and single reference point the location of said dark location within said selected surface area viewed by said camera means and comparing said location to said reference point, and generating therefrom a signal causing said actuating means to shift said movable member to a predetermined position relative to said surface location.

2. An apparatus as set forth in claim 1 further comprising:

a controller means for said camera means for controlling the sequencing of said light sensing video elements of said camera means;

a first memory means adapted to receive said digital information from said converting means and adapted to supply said digital information at a controlled rate to said processor means;

a control circuit means for said first memory means, said control circuit means including a counter circuit; and said controller means for said camera means and said control circuit means for said first memory means selecting digital information from only said one prescribed row of said light sensing video elements to provide to said processor means.

3. An apparatus as set forth in claim 2 further comprising:

said processor means after completing its action on digital data from one row of said light sensing video elements provides a signal to said control circuit means to repeat the sequence upon a select control pulse of said controller means.

4. An apparatus as set forth in claim 2 further comprising:

said controller means providing a vertical sync pulse at a first field scan of said matrix of light sensing video elements, and a horizontal sync pulse on each horizontal scan of said matrix of light sensing video elements, said vertical sync pulse entering said control circuit means and setting said counter circuit and each said horizontal sync pulse entering the control circuit to be counted by said counter circuit, said control circuit means at a predetermined number of horizontal sync pulses which is approximately at the center of said matrix of light sensing video elements causes the first memory means to receive digital data from said converting means, after which the next horizontal sync pulse stops the input of digital data from said converting means.

5. Apparatus for positioning an implement along a seam which reflects less light than adjacent areas comprising:

a movable support means adapted to be positioned adjacent said seam;

an implement carried by said support means;

a camera means carried by said support means, said camera means having light sensing video elements arranged in a two-dimensional tracking matrix of rows and columns which provide tracking data and are adapted to generate individual voltages according to the intensity of light incident on said light sensing video elements so that said seam is represented darker than said adjacent areas and voltage output signals are generated accordingly;

light source means adapted to direct a constant light beam toward said seam and adjacent areas for illuminating said seam and adjacent areas with an uninterrupted and continuous solid light pattern;

said camera means adapted to be positioned to receive said light reflected from said adjacent areas and said seam;

converting means for changing the individual voltages of said light sensing video elements of said camera means into digital tracking information;

processor means for receiving said digital tracking information representing the light intensity levels incident upon said light sensing video elements in said two-dimensional matrix of said camera means and generating therefrom an average threshold value which determines light and dark voltage signals; and said processor means also determining from digital tracking information from only a single prescribed row of said two-dimensional matrix the location of said seam, and for producing an error signal representative of the distance of said implement from its desired location relative to said seam, actuating means for causing said support to move relative to said seam, said actuating means being activated by said error signal of said processor means to move said movable support means so as to place said implement at its desired location relative to said seam.

6. An apparatus as set forth in claim 5 further comprising:

said light means carried by said support means and adapted to direct light on the area viewed by said camera means;

said camera means having a lens means for focusing the reflected light.

7. An apparatus as set forth in claim 6 further comprising:

a first memory means adapted to receive said digital information from said converting means and adapted to supply said digital information at a controlled rate to said processor means; and a control circuit means for said first memory means, said control circuit means including a counter circuit.

8. An apparatus as set forth in claim 7 further comprising:

a controller means for said camera means for controlling the sequencing of said byte-sensing video elements of said camera means;

said controller means for said camera means and said control circuit means for said first memory means selecting only said one prescribed row of said light sensing video elements to provide digital information to said processor means.

9. An apparatus as set forth in claim 8 further comprising:

said processor means in determining the location of said seam calculates from the received digital information from said two-dimensional matrix an average value representing a dark area, an average value representing a lighted area, and then produces a threshold level so that signals therebelow are considered dark signals and all signals thereabove are considered light signals, and then calculates therefrom the location of both edges of the seam which is dark, and then calculates the center of the dark seam and produces said tracking error signal for said actuating means.

10. An apparatus as set forth in claim 9 further comprising:

said actuating means having a digital drive motor and said tracking error signal to said drive motor is digital and represents the number of pulses necessary to align said implement with said seam.

11. An apparatus as set forth in claim 10 further comprising:

said processor having values stored in its memory of previous error signals and threshold levels, and said processor compares these stored values with current values so as to provide a shut down operation signal when predetermined change values are exceeded.

12. An apparatus as set forth in claim 9 further comprising:

said processor means being a microprocessor;

said camera means being a charge injection device television camera;

said implement being a welding tool; and said camera means and said implement adapted to be approximately aligned with said seam.

13. An apparatus for controlling the movement of a welding implement so that said welding implement is properly positioned relative to a joint of a work piece to be welded, comprising:

a movable support member adapted to be placed in a cross position of the joint to be welded:

a welding implement carried by said support member;

a camera means carried by said support member and adapter to track the joint to be welded;

said camera means having light sensing video elements arranged in a two-dimensional matrix of rows and columns which have a predetermined spaced position relative to one another to provide known tracking positions including a reference position, said reference position consisting of a single prescribed reference video element in a single prescribed row of said two-dimensional matrix, said video elements adapted to generate individual voltages according to the intensity of light incident on each of said light sensing video elements;

converting means for changing the individual voltages of said sensing video elements of said camera means into digital tracking information representing said tracking positions in said single prescribed row;

a light means carried by said support member, and adapted to direct a constant solid light onto an area about and including the joint of a work piece to be welded;

said joint is characterized by reflecting less light toward said camera means as compared with the surrounding area;

processor means for receiving said digital information representing the light intensity levels incident upon said light sensing video elements of said camera means and determining the positions of said light sensing video elements upon which said reflected light from said joint is incident upon and determining from said tracking information only from said prescribed row a deviation of said welding implement from said prescribed reference video element and the location of the joint to be welded, and for producing an error signal representative of the distance of said welding implement from its desired location relative to the joint to be welded;

actuating means for causing said support member to move in a cross direction to the joint to be welded;

said actuating means being activated by said error signal of said processor means so as to position said welding implement at a desired location relative to the joint to be welded.

14. An apparatus as defined by claim 13 further comprising:

said light sensing video elements being in a matrix of rows and columns;

a controller means for said camera means for controlling the sequencing of light sensing video elements of said camera means;

a first memory means adapted to receive said digital information from said converting means and supply at a later time said digital information to said processor means;

a control circuit means for said first memory means, said control circuit means including a counter circuit;

said controller means for said camera means and said control circuit means selecting only said one prescribed row of said light sensing video elements to provide digital information to said processor means.

15. An apparatus as defined by claim 13 further comprising:

said processor means adapted to calculate from the received digital information from said two-dimensional matrix an average value representing a low light reflected area, an average value representing a brighter lighted area, and produce a threshold level so that signals therebelow are considered dark signals, and all signals thereabove are considered light signals, and thereby calculates the location of both edges of the joint to be welded, and determines the error signal to be applied to said actuating means to place said welding implement at its desired location relative to the joint to be welded.

16. An apparatus as defined by claim 15 further comprising:

said camera means and said welding implement adapted be approximately aligned with the joint to be welded.

* * * * *